United States Patent [19]

Stern

[11] 4,238,147
[45] Dec. 9, 1980

[54] RECORDING IMAGES OF A THREE-DIMENSIONAL SURFACE BY FOCUSING ON A PLANE OF LIGHT IRRADIATING THE SURFACE

[75] Inventor: Howard Stern, Greenlawn, N.Y.

[73] Assignee: Solid Photography Inc., Melville, N.Y.

[21] Appl. No.: 41,717

[22] Filed: May 23, 1979

[51] Int. Cl.³ .................... G03B 29/00; G03B 35/08; G03B 17/02; G03B 5/06
[52] U.S. Cl. ............................ 354/77; 354/113; 354/160; 354/189
[58] Field of Search ............. 354/112, 113, 65, 70, 354/160, 189, 77

[56] References Cited

U.S. PATENT DOCUMENTS

| | | | |
|---|---|---|---|
| 891,013 | 6/1908 | Smith | 354/113 |
| 1,596,458 | 8/1926 | Schiesari | 354/77 |
| 2,177,737 | 10/1939 | Mohr et al. | 354/189 |
| 3,479,945 | 11/1969 | Koch | 354/160 |

*Primary Examiner*—Donald A. Griffin
*Attorney, Agent, or Firm*—Max Fogiel

[57] ABSTRACT

An arrangement in which a three-dimensional surface is copied by recording images of planar sections of the surface. The surface is subdivided into the sections, and the sections are illuminated in sequence by a projector which directs a plane of light against the surface. A camera spaced from the projector records the intersection of the illuminating plane with the surface. By recording sections in sequence with the camera, the entire surface may be covered. The camera is focused on the illuminating plane in the region about the object surface.

15 Claims, 3 Drawing Figures

RECORDING IMAGES OF A THREE-DIMENSIONAL SURFACE BY FOCUSING ON A PLANE OF LIGHT IRRADIATING THE SURFACE

BACKGROUND OF THE INVENTION

In copying or reproducing three-dimensional surfaces, heretofore, the conventional technique involves the recording of images of sections of the surface, which are illuminated by a plane of light directed against the surface. The images are recorded of the sections where the plane of light intersects the surface. The plane of light is produced by a projector which directs the light against the surface.

In carrying out the conventional methods for reproducing three-dimensional surfaces, the camera which views the surface and records the intersections of the plane of light and surface sections, is displaced from the projector or the light plane. In practice, the camera is at a substantial angle to the light plane.

When the optical axis of the camera is substantially perpendicular to the light plane, it is possible to locate a surface point and record it on the camera film with particularly high accuracy. However, when that angle is substantially small, substantially poor accuracy is incurred in locating a point on the surface of the object to be reproduced.

Copying systems for reproducing three-dimensional surfaces are conventionally constructed so that small angles prevail between the optical axis of the camera and the light plane, because hidden areas or holes cannot be viewed by the camera when large angles prevail. Thus, shadow effects are present when the reproduction system possesses large angles between the optical axis of the camera and the light plane.

When using such small angles in conventional systems, the camera focus is not suitable for all points of the three-dimensional object surface. Thus, if the camera focus is set for one given point of this surface, the focus cannot be expected to be properly set for other points of a general three-dimensional surface. As a result, the focus is required to be continuously adjusted in conventional systems.

Accordingly, it is an object of the present invention to provide an arrangement in which the camera focus may be set so that it is in proper focus for substantially all points of the surface to be recorded, without having to readjust the setting of the focus for differently located points on the surface.

Another object of the present invention is to provide an arrangement of the foregoing character which is substantially simple in construction and may be economically fabricated.

A further object of the present invention is to provide an arrangement as described, which may be readily maintained in service with substantially long operating life.

SUMMARY OF THE INVENTION

The objects of the present invention are achieved by providing an arrangement in which the camera is focused on the light plane in a region about or encompassing the object surface to be viewed.

In accordance with the present invention, planes passed through the film of the camera, the camera lens, and the light plane, all meet along a common line. As a result of this arrangement the camera is in focus with respect to all intersections of the light plane with the object surface, so that images of surface sections illuminated by the light plane appear in focus on the thin focal plane of the camera.

The construction in accordance with the present invention is achieved by inclining the camera lens plane with respect to the film plane so that these two planes intersect along a line which lies in the light plane transmitted by the projector.

In another embodiment of the present invention, the effect resulting from inclining the lens plane with respect to the film plane of the camera is produced by providing a wedge-shaped coherent fiber optic bundle between the lens and film of the camera. By the use of such a fiber optic bundle, it is possible to use conventional camera structure in which the lens plane and film plane of the camera are parallel to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
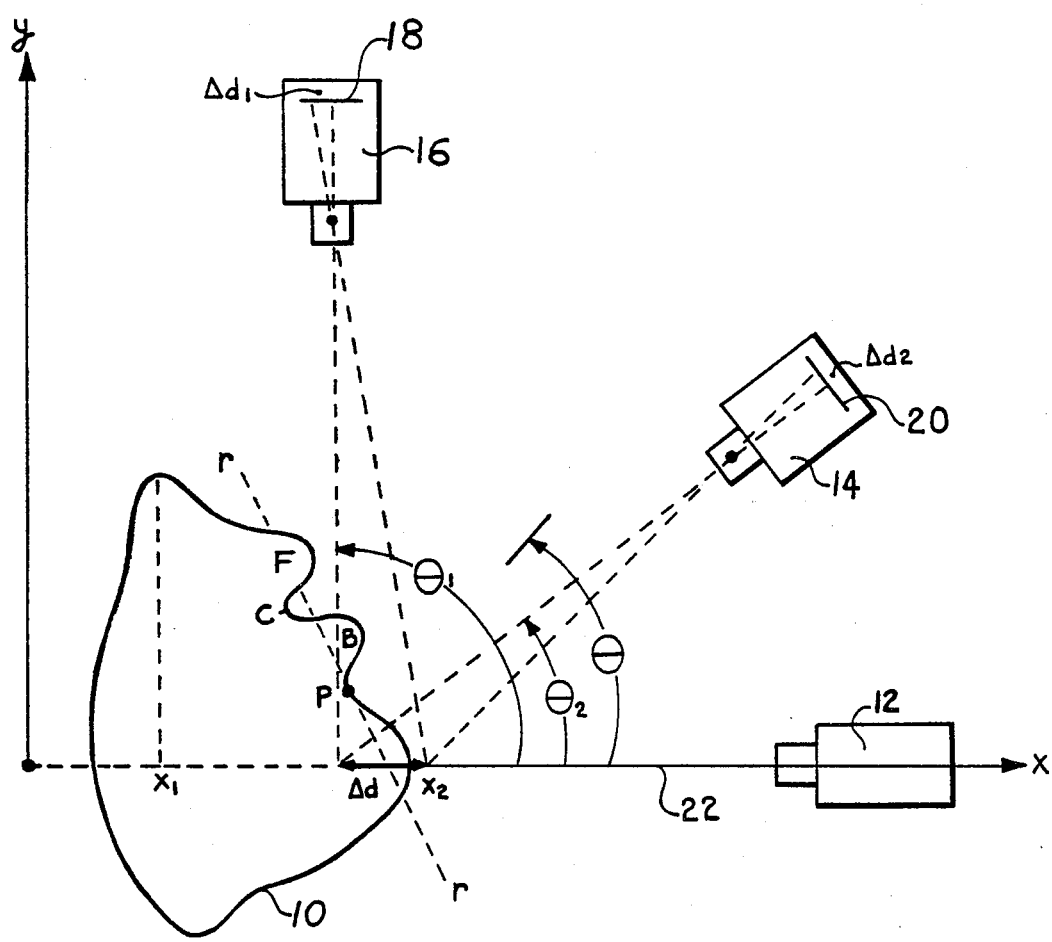
FIG. 1 is a schematic elevational view and shows an arrangement for viewing an object with a camera so as to avoid shadowing effects.

Referring to FIG. 1, the projector 12 directs a plane of light against an object surface 10. When viewing FIG. 1, the plane of light passes through the optical axis of the projector (x-axis) and is perpendicular to the plane of the drawing. A camera 14 may be angularly displaced from the projector by an angle $\theta$. This angle $\theta$ represents the angle between the plane of light and the optical axis of the camera. The plane of light may be generated by the projector 12 by known techniques using, for example, apertures with slits.

When a camera 16 is positioned so that its optical axis is substantially perpendicular to the light plane, whereby $\theta = \theta_1 = 90°$, the accuracy of locating a point on the object surface 10 is substantially high. The high accuracy condition prevails because a change in the camera ray angle, and therefore the movement of an illuminated point on the camera film plane 18 for a given depth change $\Delta x$ on the surface is maximized. When, on the other hand, a camera 14 is located at an angle $\theta$ which is substantially less than 90°, substantially low accuracy is obtained because a large change in depth causes only a small angular change which, in turn, causes only a small movement at the film plane 20. The relationship in accuracies of cameras 14 and 16 placed at different angles with respect to the light plane of the projector 12, may be observed in FIG. 1.

Thus, it may be seen that $\Delta d_1/\Delta d$ is much larger than $\Delta d_2/\Delta d$ because $\theta_1$ is much larger than $\theta_2$. However, although camera 16, in the position shown, provides more favorable accuracies, the camera 14 is more used in practice at a substantially smaller angle with respect to the light plane 22, because the camera 16 experiences difficulties in viewing hidden areas or holes. For example, if the object surface 10 is advanced in increments sequentially in the y direction as pictures are taken by the camera, all surface features on the right-hand side of the object surface 10 shown in FIG. 1 will become eventually illuminated, but only camera 14 will be able to view images of point P and contour C. This results from the condition that the internal curve of contour C is hidden from camera 16 because ledge F is in the line of sight from the camera 16. Similarly, ledge B hides point P from camera 16. To avoid such problems in which the camera 16 cannot see all points on the object surface, the camera 14 is used in practice. The camera 14, in the position shown in the drawing, makes it possible to see a large selection of object features without experiencing the shadowing effects encountered by the camera 16.

Camera 14, however, has the disadvantage that when in the position shown in the drawing, where the angle $\theta$ is substantially less than 90°, the camera is not suitable for focusing on all points of the object shown. For example, if the camera 14 is focused along the plane r-r, as in common practice, it may be seen that the lower portion of the object will not be in focus. Similarly, whereas the upper portion of the object may be initially in focus, sections of the surface illuminated by the light plane will not remain in focus, as the object surface is advanced in increments in the y direction. Thus, it may be seen from FIG. 1, that as the object surface 10 is traversed in the y direction, the camera is required to focus from $x_1$ to $x_2$. In accordance with this condition, the aperture of the camera 14 must be decreased to maintain adequate depth of field over the required depth range. However, decreasing the aperture limits, in turn, the resolvable camera spot size due to diffraction, and this decreases the accuracy and resolution obtainable since $\Delta d_2/\Delta d$ is small. Thus, the resolvable spot size on the surface $\Delta d$ suffers because the spot size on the film increases due to the diffraction effects of the stopped-down aperture. The stopping-down of the aperture is common to all reproduction systems in which the camera focuses on the object, as best as possible.

In accordance with the practice of the present invention, the camera focuses on the light plane itself, instead of focusing on the object surface. Since the intersection of the light plane with the surface of the object must necessarily always be in this light plane, it may be seen that the intersection will always be in focus, regardless of the shape of the object surface. Since focus is from object plane to image plane, a negligible depth of field is required. As a result, a wide-open aperture may be used.

Figure 2:
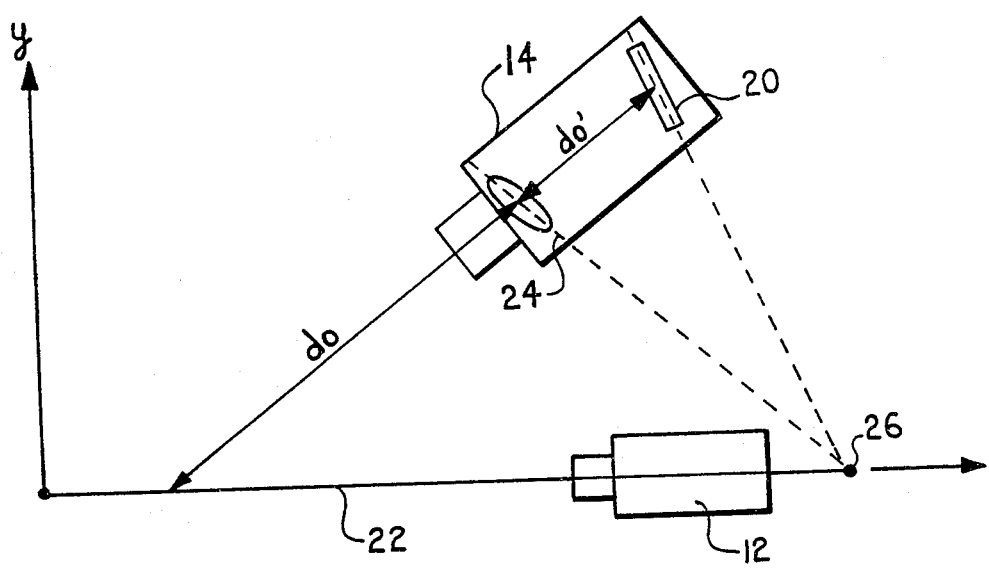
FIG. 2 is a schematic view and shows the relationships among the camera lens plane, camera film plane, and light plane directed against the object surface by a projector, in accordance with the present invention.

In order to practice the present invention, the standard conventional camera cannot be used to focus on the light plane, because the light plane is not orthogonal to the camera axis. It can be shown, however, that by arranging the camera film plane, camera lens plane, and light plane so that they all meet along a common line of intersection, the focusing of the light plane on the film plane can be achieved. The resulting arrangement and interrelationships of the planes are shown in FIG. 2. Thus, the film plane 20 is inclined with respect to the lens plane 24 so that these two planes intersect the light plane 22 along a common line 26. It is essential to note that along any camera ray, the local camera magnification is still given by the ratio of distances from the lens; i.e., image size is to object size, as lens to film distance $d_o^1$ is to lens to object distance $d_o$ (when viewed along the ray). However, this ratio varies across the field of the image, in contrast to the constant magnification between object plane and image plane when the planes of the lens, film and object are all parallel to each other.

Figure 3:
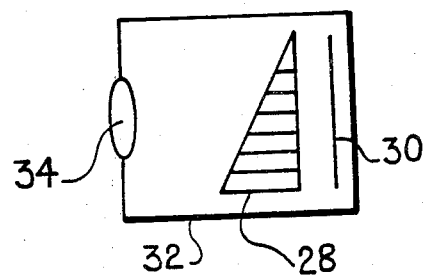
FIG. 3 is a schematic view of another embodiment of the arrangement of FIG. 2, using a coherent fiber bundle.

In an alternate embodiment shown in FIG. 3, a wedge-shaped coherent fiber optic bundle 28 is placed between the lens and the film planes so that the fiber optic bundle receives the image plane where it is in substantially perfect focus and transmits it to the normal film plane location 30. In the embodiment of FIG. 3 the camera 32 is arranged so that the planes of the film 30 and the lens 34 are parallel to each other. Thus, by using the wedge-shaped fiber optic bundle 28, the effect in FIG. 2 is obtained with standard camera construction in which the lens and film planes are parallel.

To minimize lens aberrations caused by off-axis rays, it is preferred, but not required, that the lens plane be orthogonal to the line of site directed to the center of the portion of the light plane being used.

Without further analysis, the foregoing wil so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for recording surface characteristics of an object, comprising: generating a plane of electromagnetic energy and directing said plane of electromagnetic energy against a surface to be recorded for irradiating said surface in a substantially planar section defined by the intersection of said plane of energy and said surface; arranging a lens plane and a film plane of a camera so that said plane of energy, said lens plane and said film plane all intersect in a common line; and focusing said camera on said plane of electromagnetic energy in a region about said surface to be recorded.

2. A method as defined in claim 1, wherein said camera has an optical axis forming an angle of substantially less than 90° with said plane of electromagnetic energy.

3. A method as defined in claim 2, wherein said surface to be recorded has an irregular contour with portions not viewable by an auxiliary camera having an optical axis directed substantially perpendicular to said plane of electromagnetic energy.

4. A method as defined in claim 1, wherein said lens plane and said film plane are angularly disposed relative to each other.

5. A method as defined in claim 1, wherein said lens plane is orthogonal to the line of sight directed to the center of a portion of said plane of energy about the surface to be recorded for minimizing lens aberrations.

6. A method as defined in claim 1, wherein said camera remains focused for substantially all points on the surface to be recorded.

7. A method as defined in claim 6, wherein said surface to be recorded and said plane of energy are moved relative to each other in increments, said surface being subdivided into a plurality of increments, said increments being irradiated in sequence by said plane of electromagnetic energy, so that the characteristics of said surface are recorded by recording in sequence all of said increments.

8. An arrangement for recording surface characteristics of an object, comprising: means for generating a plane of electromagnetic energy and directing said plane of electromagnetic energy against a surface to be recorded for irradiating said surface in a substantially planar section defined by the intersection of said plane of energy and said surface; camera means having a lens plane and a film plane arranged so that said plane of energy, said lens plane and said film plane all intersect in a common line; said camera means being focused on said plane of electromagnetic energy in a region about said surface to be recorded.

9. An arrangement as defined in claim 8, wherein said camera means has an optical axis forming an angle of substantially less than 90° with said plane of electromagnetic energy.

10. An arrangement as defined in claim 8, wherein said lens plane and said film plane are angularly disposed relative to each other.

11. An arrangement as defined in claim 8, wherein said surface to be recorded has an irregular shape with areas not viewable by an auxiliary camera having an optical axis directed substantially perpendicular to said plane of electromagnetic energy.

12. An arrangement as defined in claim 8, wherein said camera means remains in focus for substantially all points on the surface to be recorded.

13. An arrangement as defined in claim 12, wherein said surface to be recorded is moved relative to said plane of electromagnetic energy in increments, said surface being subdivided in increments so that said surface is recorded by irradiating and viewing all increments in sequence.

14. An arrangement for recording surface characteristics of an object, comprising: means for generating a plane of electromagnetic energy and directing said plane of electromagnetic energy against a surface to be recorded for irradiating said surface in a substantially planar section defined by the intersection of said plane of energy and said surface; camera means having a lens plane and a film plane arranged so that said plane of energy, said lens plane and said film plane all intersect in a common line; said camera means being focused on said plane of electromagnetic energy in a region about said surface to be recorded; a wedge-shaped coherent fiber optic bundle located between said lens plane and said film plane.

15. An arrangement as defined in claim 4, wherein said lens plane is parallel to said film plane.

* * * * *